United States Patent
Murphy, Jr.

(10) Patent No.: US 7,900,056 B1
(45) Date of Patent: Mar. 1, 2011

(54) DIGITAL DATA PROCESSING METHODS AND APPARATUS FOR MANAGEMENT OF SOFTWARE INSTALLATION AND EXECUTION

(75) Inventor: Kevin J. Murphy, Jr., Marlborough, MA (US)

(73) Assignee: Network Engines, Inc., Canton, MA (US)

( * ) Notice: Subject to any disclaimer, the term of this patent is extended or adjusted under 35 U.S.C. 154(b) by 827 days.

(21) Appl. No.: 11/120,133

(22) Filed: May 2, 2005

Related U.S. Application Data

(60) Provisional application No. 60/566,891, filed on Apr. 30, 2004.

(51) Int. Cl.
*G06F 11/30* (2006.01)
*G06F 12/14* (2006.01)

(52) U.S. Cl. ..................................................... 713/189
(58) Field of Classification Search .................. 713/189
See application file for complete search history.

(56) References Cited

U.S. PATENT DOCUMENTS

| | | | |
|---|---|---|---|
| 6,651,249 B2 | 11/2003 | Waldin et al. | |
| 2004/0117631 A1* | 6/2004 | Colvin | 713/179 |

\* cited by examiner

*Primary Examiner*—Kambiz Zand
*Assistant Examiner*—Stephen Sanders
(74) *Attorney, Agent, or Firm*—Nutter McClennen & Fish LLP; David J. Powsner

(57) ABSTRACT

Methods for management of software installation and/or execution utilize a third-party management system to load a "fingerprint" to user digital data processing equipment before a file (such as a patch installation file) can be installed and/or executed on that equipment. The fingerprint can be a filename, file length, CRC code and/or encrypted form of one or more of the foregoing or of any other information that identifies the software to be installed and/or executed.

15 Claims, 2 Drawing Sheets

DIGITAL DATA PROCESSING METHODS AND APPARATUS FOR MANAGEMENT OF SOFTWARE INSTALLATION AND EXECUTION

BACKGROUND OF THE INVENTION

This application claims the benefit of priority of U.S. Provisional Patent Application Ser. No. 60/566,891, filed Apr. 30, 2004, entitled Digital Data Processing Methods And Apparatus For Remote Management Of Software Patch Installation, the teachings of which are incorporated herein by reference.

The invention pertains to digital data processing and, more particularly, to methods and apparatus for remote management of software patches. The invention has application, by way of non-limiting example, in controlling installation of software patches by users of remote computers.

Patches are commonplace for any software product. Software publishers usually make these available to users to update previously installed software packages, e.g., to correct bugs, to provide features upgrades and/or to update associated program data. The frequency, size, distribution method, and required user interaction varies greatly depending on the vendor, the patch, the application and the severity, to name a few. However, it is not uncommon for the publishers to notify users, upon program boot-up, of the availability of a patch and to provide a link via which they can access the publisher's support site in order to initiate download and/or installation of the patch.

Heretofore, the art has focused on facilitating the provision of patches by publishers and/or their installation by users. Thus, for example, U.S. Pat. No. 6,651,249 discloses a so-called "tiered" approach to patch distribution, whereby each patch is assigned a tier or level that indicates how many individual updates are spanned by the patch. This is said to facilitate updating of user applications without necessitating maintenance of large numbers of update patches.

Though well and good for the publishers and users, such art does little to facilitate monitoring and/or control of patch installation by third-party providers responsible for other aspects of operation of a user equipment or software. Thus, for example, a user's haphazard installation of patches may make it impossible for the third-party provider to determine whether an apparent malfunction results from a vendor-supplied product, other parties' products and/or user error. While it would seem desirable, simply, to have the third-party remotely install user patches, many software publishers prohibit this: they permit patches to be installed only locally.

Accordingly, an object of this invention is to provide improved digital data processing methods and apparatus.

A related object is to provide such methods and apparatus as facilitate remote management of computer equipment.

Still a further related object is to provide such methods and apparatus as facilitate remote management of software installation and execution.

A still further related object is to provide such methods and apparatus as facilitate software patch installation and execution.

Yet still another object of the invention is to provide such methods and apparatus as facilitate such management at minimal cost and interference to user, publisher, and third-party provider alike.

Still yet another object of the invention is to provide such methods and apparatus that work with all manner of user digital data processing apparatus, such as, by way of non-limiting example, "headless" server appliances, e.g., servers that lack a monitor, keyboard and mouse (or other such user display and input devices).

SUMMARY OF THE INVENTION

The foregoing are among the object attained by the invention which provides, in one aspect, methods for managed software installation and execution, including patch management, that utilize a third-party management system to load a "fingerprint" to user digital data processing equipment before the software (e.g., patch), itself, can be installed or executed on that equipment. The fingerprint can be a filename, file length, CRC code and/or encrypted form of one or more of the foregoing or of any other information that identifies the software to be installed or executed.

A related aspect of the invention provides such methods in which, prior to installing and/or executing the software (e.g., patch), (i) the customer identifies, to the third-party management system, the equipment on which the software is to be installed and/or executed, and (ii) the third-party management system loads the finger-print into a "hidden" file on that equipment. The customer can provide the identification, e.g., in the form of an IP address of the equipment. The hidden file can be a file, address or other accessible location unknown to the user on that equipment.

A further related aspect of the invention provides a method as described above in which, subsequent to loading of the fingerprint, the user can initiate installation of the software (e.g., patch) to his digital data processing equipment (e.g., if it is not already resident there) by responding to a request generated by that equipment. Such a request is preferably generated by management agent software executed by the equipment onto which the software is to be installed. That agent software generates the request, e.g., in response to an instruction issued by the third-party management system in connection with loading of the fingerprint.

Yet still further related aspects of the invention provide such methods in which, prior to executing the downloaded software (e.g., patch) file, the management agent software compares selected information about the software file requested with the fingerprint contained in the hidden file. The agent software can record to a file the success of the comparison and installation, for later interrogation by the management system. Alternatively, or in addition, the agent software can communicate the success of the comparison and/or installation directly to the management system.

Still other aspects of the invention provide methods as described above in which one or more of the following steps are performed in order to install software (e.g., such as a patch) on user digital data processing equipment (and a subset of which are performed in order to execute software on that equipment):

1. Management System gets software file to be installed and/or executed, e.g., from Software Publisher.
2. Management System creates fingerprint of the software file, e.g., based on file name, file length and encryption of file's CRC.
3. Management System notifies User of (i) availability of software (e.g., via Software Publisher) and (ii) necessity of responding to a request (e.g., an "upload request" page) from Management System in order to install and/or execute the software on user equipment.
4. Software file from Software Publisher is downloaded, e.g., manually (by user or other person) or automatically (by Management System, Software Publisher, or otherwise).

5. User accesses Management System to provide IP address of user equipment on which software is to be installed and/or executed.
6. Management System stores fingerprint to hidden file on user equipment and causes that equipment to generate a request (e.g., the upload request page).
7. User responds to the request with identity of software file to be installed and/or executed.
8. Management System Agent code executing on user equipment compares fingerprint in hidden file with software file specified by User.
9. If comparison is favorable, Management System Agent code (i) causes software file to be executed (and, if applicable, therefore installed) (ii) records success of execution and/or installation in file for later interrogation by Management Systems and/or communicates success to Management System.
10. If comparison is not favorable, Management System does not permit software to be executed, logging this fact in a file for interrogation by the Management Systems and/or communicating that fact directly to the Management System.

Further aspects of the invention provide methods as described above in which the management system executes on a server.

Still further aspects of the invention provide methods as described above in which communications between the user equipment, management system and/or software publisher are carried over a network, such as the Internet.

Yet still further aspects of the invention provide systems, e.g., comprising a user server appliance or other digital data processor and comprising a management system digital data processor, operating in accord with the methods above.

These and other aspects of the system are evident in the drawings and in the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
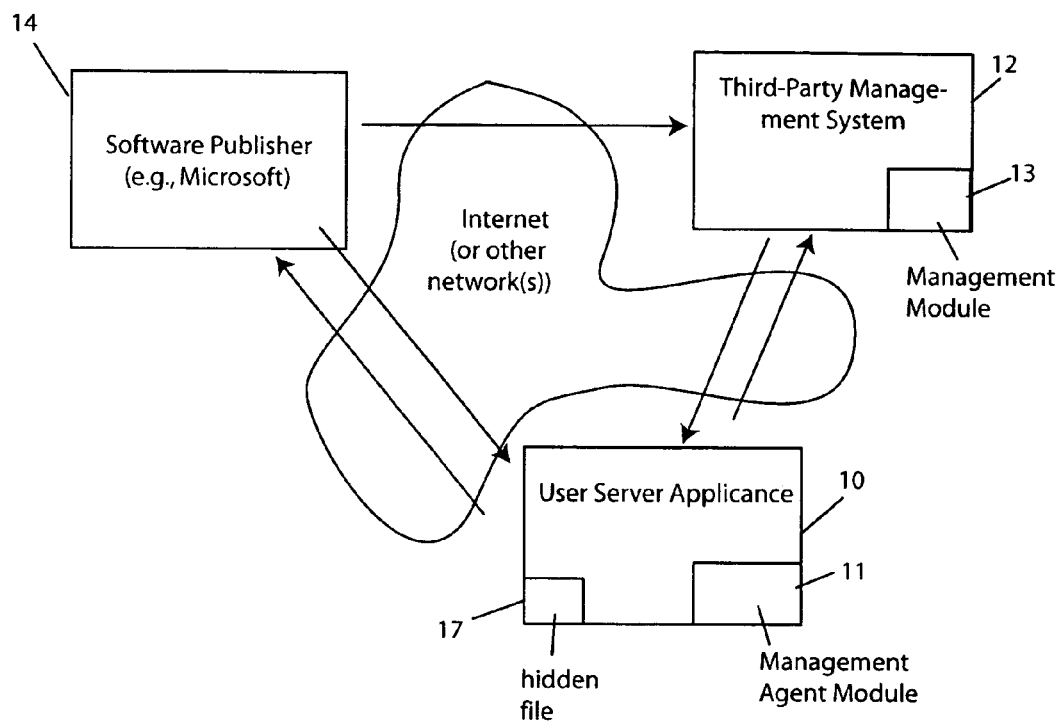
FIG. 1 depicts an environment in which the invention is practiced.

FIG. 1 depicts an environment of the type in which the invention is embodied. Shown there is user digital data processor 10 for which software installation and/or execution (as well, optionally, as other aspects of operation) is managed by a third party. The digital data processor 10 (referred to below, without loss of generality, as "appliance" 10) can be a headless or non-headless server appliance or it can be any other digital data processing apparatus (stand-alone, embedded or otherwise) capable of executing software. As noted above, a "headless" server is one that lacks a monitor, keyboard and mouse (or other such user display and input devices).

Also shown in the drawing is a third party management system 12. In the illustrated embodiment, this is a server or other digital data processing apparatus that communicates with user appliance 10 via the Internet or other network. Illustrated management system 12 (referred to below, without loss of generality, as "server" 12) is operated by a third-party service or equipment provider that is contractually engaged to manage one or more aspects of operation of the appliance 10, including by necessity or otherwise, the management of software (e.g., patch) installations and executions thereon. However, server 12 may be operated for other reasons and/or by other persons or entities, including the seller, distributor, publisher or other source of the software being installed (and/or executed) and/or user-operator of appliance 10. To this end, the term "third-party" refers to such persons or entities too.

The drawing shows, still further, software publisher 14. That entity is represented, in the illustrated embodiment, as a server or other digital data processing apparatus from which software (including patches) and notices regarding the same are communicated to the appliance 10 and server 12 via the Internet or other network. However, in other embodiments, such software and notices may be communicated in other ways, including, by air mail or other forms of delivery.

Illustrated appliance 10 and server 12 are equipped with software modules or other functionality (e.g., special-purpose hardware) that permit the third-party, e.g., via server 12, to manage installation and/or execution of software (such as patches) on the appliance 10. (As will be appreciated by those skilled in the art, software installation—whether of a patch or otherwise—typically involves execution of a software file, to wit, an installation file). While, as noted previously, in the case of patches, it would seem desirable to have the third-party (or third-party server 12) remotely install patches directly to appliance 10, many software publishers 14 do not allow distribution of patches (requiring, instead, that users download the patches directly) and/or prohibit remote installation of patches (requiring that users perform that step locally). By permitting the third-party to manage installation of patches on the appliance 10—and, more generally, to manage installation and/or execution of all (or selected) software on the appliance—the aforementioned modules (or other functionality) provide a layer of security (e.g., through obfuscation) and maintain controlled environment in which the server operate.

Figure 2:
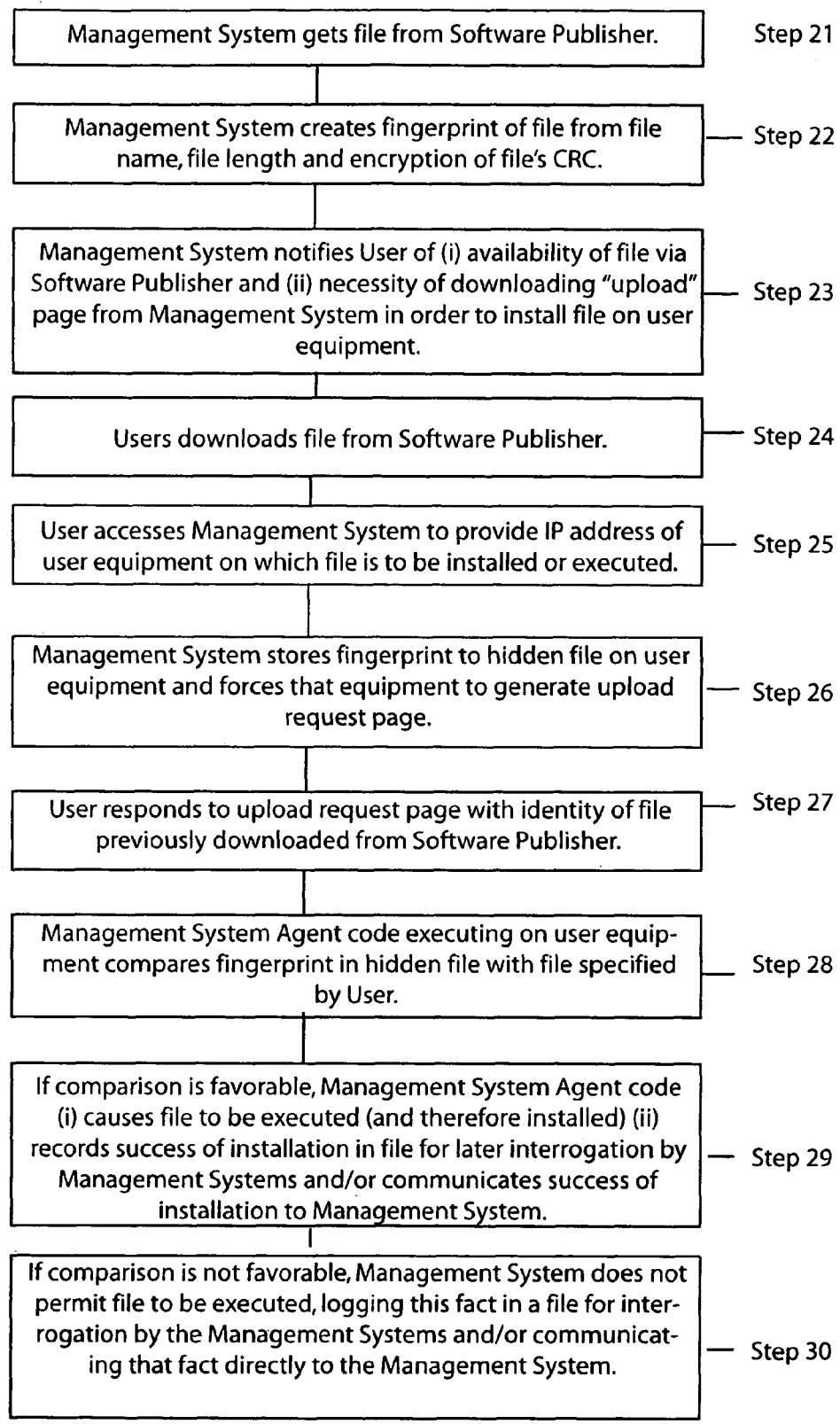
FIG. 2 is a flowchart depicting a method according to the invention.

Shown in FIG. 2 and described below are software modules and other functionality used in one practice of the invention to manage installation and execution of patch software. Those skilled in the art appreciate that these teachings can be utilized to manage installation and/or execution of all classes of software (e.g., applications software, operating system tools, and so forth) on appliance 10.

The illustrated embodiment comprises patch management software module 13 executing on server 12 and patch management agent software module 11 executing on appliance 10. Methods of operation of the appliance 10 and server 12 in connection with those modules, as well as the interaction of those digital data processors 10, 12 with one another and with software publisher server 14, for purposes of patch installation management (and, again, more generally, for purposes of software installation and/or execution management) are illustrated in FIG. 2.

Referring to that drawing, in step 21, management module 13 gets patch file (and/or other software file whose installation and/or execution is to be managed) from software publisher 14 or other source. The management module 13 can be alerted to the existence of the patch file (or other file) by action of the software publisher 14 itself, or otherwise.

In step 22, management module 13 creates a fingerprint of the patch (or other) file as a concatenation (or other combination) of its name, file length and encryption of the file's CRC. In other embodiments, fingerprints are created from other attributes of the patch file (or other file to be installed and/or executed). Regardless, such fingerprints have the characteristic of being unique (vis-a-vis fingerprints created from other patch files or other files installed and/or executed) and not easily replicated by the user himself or by others, e.g., thereby preventing circumvention of the patch installation management mechanism described here. That the fingerprint is not easily replicated is particularly true of the encrypted CRC. To duplicate that would require replication of the file's CRC and encryption of the CRC by the identical algorithm as that used by the management module 13 (and, of course, by the agent module 11 executing on the appliance 10—see, step 28, below).

In step 23, management module 13 notifies the user (not shown) of (i) the availability of the patch (or other file to be installed) from the software publisher 14 and (ii) the necessity of downloading a request (e.g., an "upload request" page) from the server 12 in order to install and/or execute the patch (or other) file on appliance 10. Such notification can be provided by e-mail, instant messaging, or otherwise. In some embodiments, no such notifications are used—since, for example, the user is assumed to be aware of (i) and (ii). Depending on embodiment, notification may not be provided, for example, in the case where software execution (e.g., independent of installation) is being managed.

In step 24, the patch (or other) file is downloaded from software publisher 14. (This may be unnecessary, of course, if that file is already resident on the appliance 10 and/or if the user is otherwise already in possession of that file). This can be accomplished manually, for example, by the user, e.g., via electronic download, air mail, or otherwise. Or, the download can be accomplished automatically, for example, by the management module 13, the software publisher 14, or otherwise—all, of course, to the extent enabled or permitted under the software publisher's patch or software distribution policy. Once obtained from the publisher, the patch (or other file whose installation and/or execution is being managed) file is stored on appliance 10 and/or a personal computer (not shown) utilized by the user in connection with the appliance 10.

In step 25, the user accesses server 12 (operating under control of management module 13) to provide the IP address of appliance 10, onto which the patch (or other software) is to be installed and/or executed. This communication can be facilitated by a web server module (not shown), or other interface, executing on the server 12 and by a personal computer and browser or otherwise (not shown) utilized by the user.

In step 26, management module 13 stores the aforementioned fingerprint to a "hidden" file 17. This may be a file, address or other accessible location on, or associated with, appliance 10. Though the file may be hidden, e.g., in the sense of not being directly accessible by the user during normal access of the server, that is not a requirement of the invention. Preferably, however, the file 17 is so located and/or step 26 is so executed as to prevent the user from intervening and, thereby, possibly preventing an incorrect fingerprint from being stored to the file. In this step, the management module 13 also signals the management agent module 11 to generate a request (e.g., an "upload request" page) for access by the user, e.g., via a web server module also executing on appliance 10. That page, and the web server module, in general, can be accessed by the user via a personal computer and browser or otherwise (not shown) utilized by the user.

In step 27, the user responds to the request page with identity of patch file (or other filed to be installed and/or executed) previously obtained from software publisher 14 and stored on the appliance 10 and/or aforementioned personal computer.

In step 28, management agent module 11 executing on appliance compares the fingerprint in hidden file 17 with a fingerprint similarly generated by the module 11 for the patch (or other) file specified by user.

In step 29, if comparison is favorable, the agent module 11 (i) causes patch (or other) file to be executed (and therefore, in the case of patch and/or other installation files, to be installed) on the appliance 10, and (ii) records success of installation in a file for later interrogation by the third-party and/or management module 13. Alternatively, or in addition, the agent module 11 can communicate success of installation to directly to the module 13.

In step 30, if the comparison is not favorable, module 11 does not permit the user-specified file (e.g., patch code) to be executed. Instead, it logs the discrepancy for interrogation by the third-party and/or module 13 and/or communicating the fact of failure directly to the module 13.

Those skilled in the art will appreciate that the agent module 11 can cause patch (or other) file execution, in step 29, or conversely can prevent such execution, in step 30, via a number of mechanisms known in the art. Thus, for example, the module 11 can operate at, or in conjunction with, the appliance 10 kernel to intercept file execution requests (e.g., via user-level requests), permitting only those allowed per step 28, while preventing those disallowed per step 29. Alternatively or in addition, by way of further example, agent module 11 can provide a virtual environment for execution of all (other) processes on appliance 10, permitting and/or preventing those requested by the user per steps 28 and 29.

A further understanding of the environment, system and methods described above according to a further embodiment of the invention may be attained by reference to FIG. 3 of above-mentioned, incorporated-by-reference U.S. Provisional Patent Application Ser. No. 60/566,891, filed Apr. 30, 2004, entitled Digital Data Processing Methods And Apparatus For Remote Management Of Software Patch Installation, the teachings of which figure are incorporated herein by reference.

A further understanding of the invention may be attained by reference to the Notes section of the Detailed Description of the aforesaid application, which section, too, is incorporated herein by reference. Additional such notes follow.

Notes

Salient to patch management and, more generally, to management of software installation and/or execution, is providing for software (including installation file) execution (i) on a device (e.g., appliance 10) that operates in a predictable, reliable, and secure manner, and (ii) within an environment where required interdependencies are accounted for and conflicting interdependencies are avoided. It is undesirable to have unauthorized software and wrong patches be applied.

Advantages of methods and systems of the present invention are the following, among others:

Controlling a closed, remote environment—to wit, the server (and, particularly, by way of non-limiting example, a headless server) with minimal user intervention. In this regard, the appliance may be composed of multiple critical software components that need updating. The invention permits these components to be abstracted as individual, independent pieces of functionality (from the user perspective) for ease of use and reliability.

Preventing the user from installing conflicting software, including by way of example conflicting or unnecessary patches (or updates).

Relieving the user of the burden of determining whether or not to install software, such as a patch.

Provide the third-party a level of control for support, reliability, and security, for example, insofar the user appliance remains of a precisely known configuration.

Described above is are methods and apparatus that achieve the desired objects. Those skilled in the art will appreciate the illustrated embodiment is an example of the invention and that other embodiments, incorporating changes therein, fall within the scope of the invention, Thus, for example, it will be appreciated that the methods and apparatus described above can also be used to facilitate management of installation and execution of software of all kinds—not just patches.

In view of the foregoing, what I claim is:

1. A method for patch management, comprising
    A. generating, with a third-party patch management system, a first fingerprint based on a permissible software patch,
    B. storing the first fingerprint to user digital data processing equipment,
    C. responding, with the user digital data processing equipment, to a user request to install a candidate patch file by generating a second fingerprint based on that file and comparing it to the first fingerprint to determine whether the candidate patch file is a permissible software patch, and
    D. permitting, with the user digital data processing equipment, installation of the patch file only if the first and second fingerprints match.

2. The method of claim 1, comprising generating the fingerprints from a filename, file length and encrypted CRC.

3. The method of claim 1, comprising supplying the third-party patch management system with an IP address of the user digital data processing equipment, where the storing operation of step (B) comprises storing the first fingerprint to any of the equipment at that IP address and a location associated with the equipment at that IP address.

4. The method of claim 3, wherein step (B) includes storing the first fingerprint to a file or other location generally unknown to the user on the user digital data processing equipment.

5. The method of claim 1, wherein step (D) includes recording a result of the comparison and/or success of the installation to a file for later interrogation by the management system.

6. A method for software installation management, comprising
    A. generating, with a third-party installation management system, a first fingerprint based on a permissible software installation,
    B. storing the first fingerprint to user digital data processing equipment,
    C. responding, with the user digital data processing equipment, to a user request to install a candidate software file by generating a second fingerprint based on that file and comparing it to the first fingerprint to determine whether the candidate software file is a permissible software installation, and
    D. permitting, with the user digital data processing equipment, installation of the software file only if the first and second fingerprints match.

7. The method of claim 6, comprising generating the fingerprints from a filename, file length and encrypted CRC.

8. The method of claim 6, comprising supplying the third-party installation management system with an IP address of the user digital data processing equipment, where the storing operation of step (B) comprises storing the first fingerprint to any of the equipment at that IP address and a location associated with the equipment at that IP address.

9. The method of claim 8, wherein step (B) includes storing the first fingerprint to a file or other location generally unknown to the user on the user digital data processing equipment.

10. The method of claim 6, wherein step (D) includes recording a result of the comparison and/or success of the installation to a file for later interrogation by the management system.

11. A method for managing software execution on user digital data processing equipment, comprising
    A. generating, with a third-party management system, a first fingerprint based on permissible software,
    B. storing the first fingerprint to the user digital data processing equipment,
    C. responding, with the user digital data processing equipment, to a user request to install a candidate patch file by generating a second fingerprint based on that file and comparing it to the first fingerprint to determine whether the candidate patch file is related to permissible software, and
    D. permitting, with the user digital data processing equipment, installation of the patch file only if the first and second fingerprints match.

12. The method of claim 11, comprising generating the fingerprints from a filename, file length and encrypted CRC.

13. The method of claim 11, comprising supplying the third-party management system with an IP address of the user digital data processing equipment, where the storing operation of step (B) comprises storing the first fingerprint to any of the equipment at that IP address and a location associated with the equipment at that IP address.

14. The method of claim 13, wherein step (B) includes storing the first fingerprint to a file or other location generally unknown to the user on the user digital data processing equipment.

15. The method of claim 11, wherein step (D) includes recording a result of the comparison and/or success of the installation to a file for later interrogation by the management system.

* * * * *